United States Patent [19]
Nickell et al.

[11] Patent Number: 5,960,163
[45] Date of Patent: Sep. 28, 1999

[54] COLOR BITMAP MERGING OF BLACK OBJECTS USING PARTIALLY CORRELATED SEPARATION MAXIMUM VALUE CLIPPING

[75] Inventors: Eric S. Nickell, Quezon City, Philippines; Robert M. Coleman, Altadena, Calif.

[73] Assignee: Xerox Corporation, Stamford, Conn.

[21] Appl. No.: 09/006,510

[22] Filed: Jan. 13, 1998

[51] Int. Cl.[6] .................................................. G06K 15/00
[52] U.S. Cl. ............................................ 395/109; 395/117
[58] Field of Search .................................... 395/101, 109, 395/102, 117; 358/500, 518, 523, 529, 538, 540, 450, 461, 462, 464; 399/178–180; 347/115, 172, 131, 173, 174, 175, 188

[56] References Cited

U.S. PATENT DOCUMENTS

| | | | |
|---|---|---|---|
| 4,970,562 | 11/1990 | Birnbaum et al. | 355/327 |
| 5,168,552 | 12/1992 | Vaughn et al. | 395/109 |

*Primary Examiner*—Arthur G. Evans
*Attorney, Agent, or Firm*—Robert Cunha

[57] ABSTRACT

A bitmap-based digital color printing method and system is described which automatically detects when a black object is to be printed and changes the Bit Block Transfer (BitBlt) method so that the black color becomes a mixture of black plus the background colorants, limited both by a clipping of one colorant against another and by an allowed maximum value for each remaining non-black separation. More specifically, the process reads the existing background color bits, does a first clip of one separation against another assuming that for correcting certain printing defects some separations are more important than others, and then does a second clip of remaining non-black separations to a pre-set maximum allowable amount. The result is an efficient way to control total colorant while allowing some separations precedence over others; with the result that the amount of colorant in one separation is dependent on or partially correlated with the amount of colorant in another. This preferentially limits colorants in a black object. As an example, reducing the amount of a high luminance separation (eg, yellow) relieves toner pile height problems without creating significant trapping problems. Therefore, in order to preferentially reduce yellow, the cyan or magenta components may be used to clip the yellow component in a first clipping step. By doing so, the maximum allowed colorant in both the cyan and magenta separations can be increased, which for some printing systems creates fewer visual defects in color prints.

7 Claims, 18 Drawing Sheets

COLOR BITMAP MERGING OF BLACK OBJECTS USING PARTIALLY CORRELATED SEPARATION MAXIMUM VALUE CLIPPING

BACKGROUND OF THE INVENTION

1. Field of the Invention

The present invention relates to bitmap-based digital color printing in which black objects and color objects are intermixedly printed, and more particularly, in which the composition of the black color for the black objects is automatically changed to be responsive to the amount of non-black colorants in the background color and to preset maximum allowed amounts for each separation, with a partial correlation of the amount of colorant in one separation against another.

2. Description of the Related Art

Bitmap-based digital color printers form a bitmap for each of several separations, such as cyan, magenta, yellow, and black. Each bitmap—one bitmap for each color separation—contains a 1 or a 0 for each point on the page which the print head of the color printer is able to address. By this method, the print head of the printer is instructed to turn on or off at each addressable point on the page. The bitmap for each color separation separately commands the print head which is assigned to print that particular color separation. Often, a full-color bitmap-based digital printer will construct a bitmap for cyan, magenta, yellow, and black, and then print each bitmap overlaid on the same page to produce a multitude of perceived colors through the combination of differing amounts of cyan, magenta, yellow, and black.

In particular, the color black may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is known as process black. The color black may also be formed by using the black colorant alone. In this case, it is known as single-color black.

Each type of black, process black and single-color black, have advantages and disadvantages when used in different contexts in the printing process.

When single-color black is used over a color field, it is often the case that the single-color black colorant has a gloss which is different from the gloss of the surrounding color field, and the gloss difference can be objectionable. Further, the maximum density of the single-color black colorant is often not as great as the maximum density obtainable with process black, and the density difference is particularly noticeable on certain color backgrounds. Also, the ink coverage or toner pile height of single-color black may be noticeably less than that of the surrounding color background. Finally, the presence of misregistration between the plurality of separations during the printing process, or the presence of other interactions between the separations, can result in objectionable white or light-colored fringing around a single-color black object on a color background. This occurs for example if the single-color black colorant is not printed precisely and without distortion into the hole left at that position when printing the other separations.

On the other hand, when process black is used in a white or grey field which does not contain any non-black colorants, slight misregistrations or interactions among the plurality of separations can result in objectionable color fringing at the edges of the object. Furthermore, the use of multiple colorants to form process black can result in blurred edges, thickened objects, and objectionable amounts of ink or toner coverage.

Process black can also cause problems if the same formulation of process black is used against a variety of color backgrounds. For example, a dense process black with a large amount of colorant, which might be suitable for printing over a dense or dark color background, when printed on a light colored background can create pile height or ink coverage differences between the black object and its light colored background. This can result in printing defects such as tactile unevenness or toner deletion in the background color surrounding the black object. A process black with smaller values of C, M, Y may be better suited for light backgrounds, but can show problems of "caving" if its total pile height is less than the height of the surrounding background for darker backgrounds. Further, if the C, M, Y content of a process black is significantly less than that of the color background, the chances for showing light fringes around the process black object due to misregistration is increased.

These advantages and disadvantages of single-color and process black are known in the graphics arts industry, and knowledgeable graphic artists attempt to design pages which utilize the advantages and avoid the disadvantages. However, some situations, such as a black object placed only partially over a color field, or a color background which changes rapidly, or complex text or graphics over a complex color background, make it difficult to avoid the printing problems associated with mixedly printing black and color. Furthermore, many pages not designed by a knowledgeable graphic artist can benefit from a method and apparatus to automatically create a background dependent black image.

U.S. Pat. No. 4,700,399 to Yoshida discloses a color image processing apparatus which has an edge detector and a control unit for controlling a black reproduction quantity for an edge according to an output from the detector. For edges, densities of color signals for yellow, magenta, and cyan are reduced in accordance with the edge quantity to increase black density.

U.S. Pat. No. 4,953,015 to Hayasaki et. al. discloses a method for printing a color image which makes it possible to obtain a higher density black. Black ink is placed first, and then a plurality of other inks such as cyan, magenta, and yellow are allotted according to a color matrix table and are superimposed on at least a portion of the black ink.

U.S. Pat. No. 5,241,396 to Harrington discloses a method for printing a color image which yields dense black images without thickened, blurred edges. A modified black bitmap is produced by eroding the edges on the original black bitmap. The modified black bitmap is used to instruct the printing of at least one other colorant and then the original black bitmap is used to print the black colorant to yield a dense black image.

These methods have in common the attempt to limit the blurring disadvantages of process black on a white background so that it can be used in place of single-color black.

U.S. patent application Ser. No. 08/673,541, "Color Bitmap Generation with Background Dependent Black Objects", discloses a bitmap color printing method which modifies the normal bit block transfer method by which objects are merged into a bitmap prior to printing, in order to be able, without prior knowledge of the current content of the bitmap, to change a black color as it is being merged into the bitmap so that its colorant content is responsive to the background color. (The background color may include white). This helps to maximize print quality when intermixedly printing black objects and color objects. However, this method does not address a problem that by mixing the background colors into the black, it is possible to obtain a process black which in some printing systems contains excessive colorant levels that can create other printer defects such as xerographic "tenting".

U.S. patent application Ser. No. xxxxxxx, "Color Bitmap Merging of Black Objects Using Separation Maximum Value Clipping", discloses a bitmap color printing method which modifies the normal bit block transfer method to change a black color as it is being merged into the bitmap so that its colorant content is responsive both to the background color and also to a predetermined maximum colorant level per separation. In this way, the colorant levels in the black object are background-dependent but controlled. However, solving the excess colorant problem in this way by clipping all process colorants without reference to each other often introduces a new problem. The new problem is that as each process color is reduced uniformly, often a significant difference in the foreground and background values of at least one process colorant can be created, potentially causing light-colored fringes at the foreground/background edge if there is misregistration of the black separation with respect to the process color separations. While a light-colored fringe may be preferable to a white fringe, it can still be objectionable.

By contrast, the current invention also describes a bitmap color printing method which modifies the normal bit block transfer method to change a black color as it is being merged into the bitmap so that its colorant content is responsive both to the background color and also to a predetermined maximum colorant level per separation. In addition, however, the current invention allows greater maximum colorant levels in some separations by correspondingly reducing other separations. By preferentially reducing some colorants—for example, the colorant with the highest luminance (eg, yellow in a CMYK system)—the result is that pile height is able to be controlled while creating less of the described problem of misregistration fringing. This helps to maximize print quality when intermixedly printing black objects and color objects by controlling a larger range of printer defects.

OBJECTS AND SUMMARY OF THE INVENTION

One object of the present invention is to provide a method for determining when a black object is being printed and improve image quality by merging it into a bitmap in such a way that its composition is responsive not only to the background color and a per separation maximum, but also so that the amount of certain separations are responsive to the amounts in others.

Another object of the present invention is to provide a method for determining when a black object is being printed and changing the method for merging it into a bitmap such that high luminosity separations are limited in relation to lower luminosity separations in order to decrease certain objectionable printing defects without increasing others.

To achieve the foregoing and other objects and to overcome the shortcomings discussed above, a bitmap-based digital color printing method and system is provided which automatically detects when a black object is commanded to be printed, and changes the method by which the black object is merged into the bitmap of each of the color separations in such a way that the composition of the black color includes the colorant amounts already present in the bitmap at the position on the page at which the black object is commanded to be printed, limited both by a pre-set maximum for each separation and by a first clipping step of one separation against another.

As objects are commanded to be printed, a detection operation detects if the objects are commanded to be printed in a black color—either a single-color-black or a process black. If so, an alternate Bit Block Transfer (BitBlt) method is chosen which merges the black color into the existing bitmaps in a way which generally tracks the background color already in the bitmap at that point, while clipping colorant amounts in one separation based on the amount of colorant in another, and then clipping the remaining two non-black separations if necessary against a predetermined maximum colorant amount allowed. Because a bitmap generally is composed of bits which have been generated by a halftoning process, it is unduly time-consuming to take a step of determining the actual color which has previously been commanded to be printed at the location at which the black object is commanded to be printed. Therefore, the alternate BitBlt method used is one which is not dependent on prior knowledge of the background color. Instead, since a typical BitBlt operation consists of the steps of Read, Modify, Write, the Modify step in the case of a black object is adjusted to automatically modify the bits read in one separation with respect to another separation and also be responsive to a predetermined limit for the remaining two separations. More specifically, the first clipping step can be accomplished at the bit level during the Modify step if both separations are represented with the same monotonic halftone dot specification, and the inverse of the clipping separation is ANDed with the clipped separation. The second clipping step may be accomplished by ANDing each remaining separation with its maximum allowed colorant level, expressed in the same monotonic halftone dot. In this way, the following Write operation writes a black color which is responsive to the existing bits in the bitmap where the black object is being written but clipped when necessary by two clipping steps which express the allowed colorant limits.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
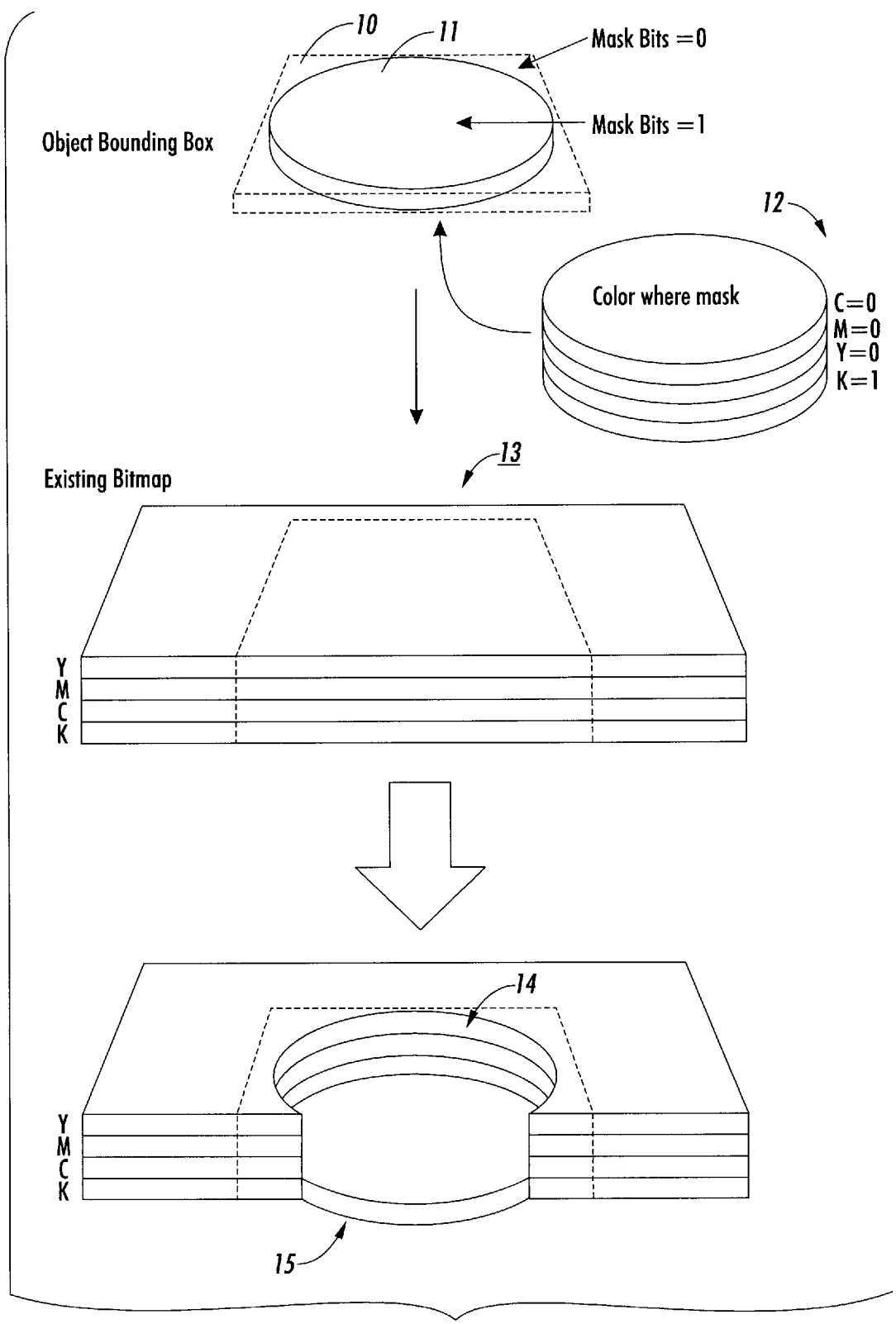
FIG. 1 shows a method of the prior art by which a single color black object is merged into existing separation bitmaps during page preparation process.

Referring now to the drawings, and particularly to FIG. 1 thereof, a single-color black object is shown being merged into an existing set of bitmaps, one bitmap per separation, which in this case comprise cyan (C), magenta (M), yellow (Y), and black (K). The object is defined by an object bounding box 10 showing the maximum extent of the object, a mask 11 defining the actual shape of the object wherever the bits are on (mask bits=1) within the bounding box 10, and a color 12 which is the color in effect wherever the mask is on (mask bits=1). In the prior art, for each separation bitmap, the merging process causes the color value 12 of that separation to be written into the existing bitmap 13, obliterating whatever values were in that separation previously. In the case of a single-color black color 12, in which the non-black separation values are all 0 (white), the effect is to erase the non-black separations (i.e., to put no colorant on the page so that the white paper shows through). The black separation is then written as full-black value (1) into the black separation. The net effect is a hole 14 in the other separations and a single-color black object 15 at the bottom of that hole.

Figure 2:
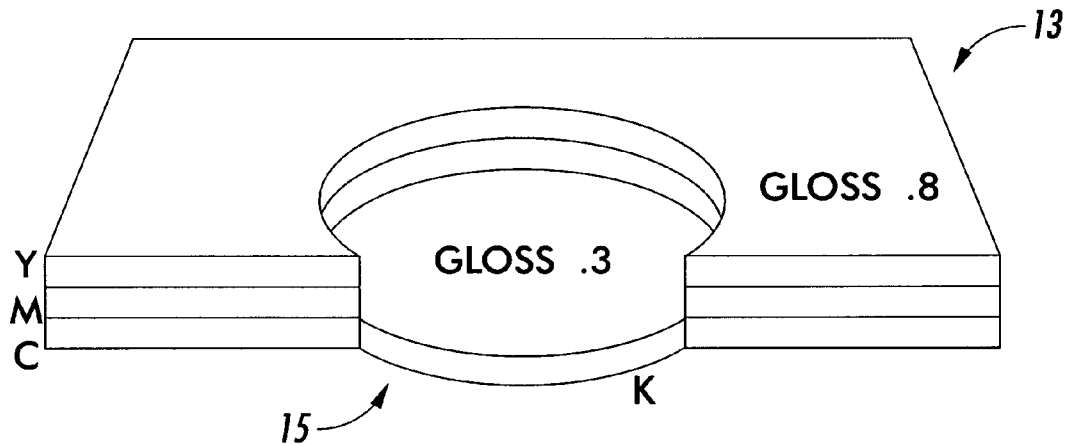
FIGS. 2 and 3 show sample outputs which demonstrate print quality problems produced by following the prior art method illustrated in FIG. 1.
Figure 3:
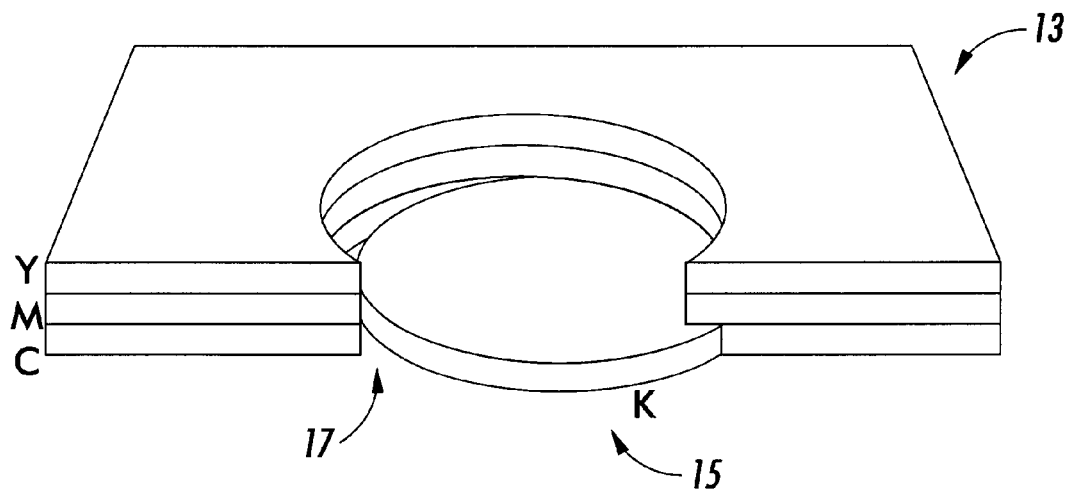

FIGS. 2 and 3 show print quality problems which can occur as a result of the prior art method shown in FIG. 1. In FIG. 2, the single-color black object 15 can be seen to have a gloss level and coverage level (toner height, in the example shown) which may be objectionably different from the color background 13. It is not shown that a single-color black object 15 may also have an inadequate maximum density when imaged on some color fields. A further problem is shown in FIG. 3. In this case, an objectionable white fringe 17 can occur around part of the single color black object 15 due to misregistration of object 15 in relation to the surrounding color field 13.

Figure 4:
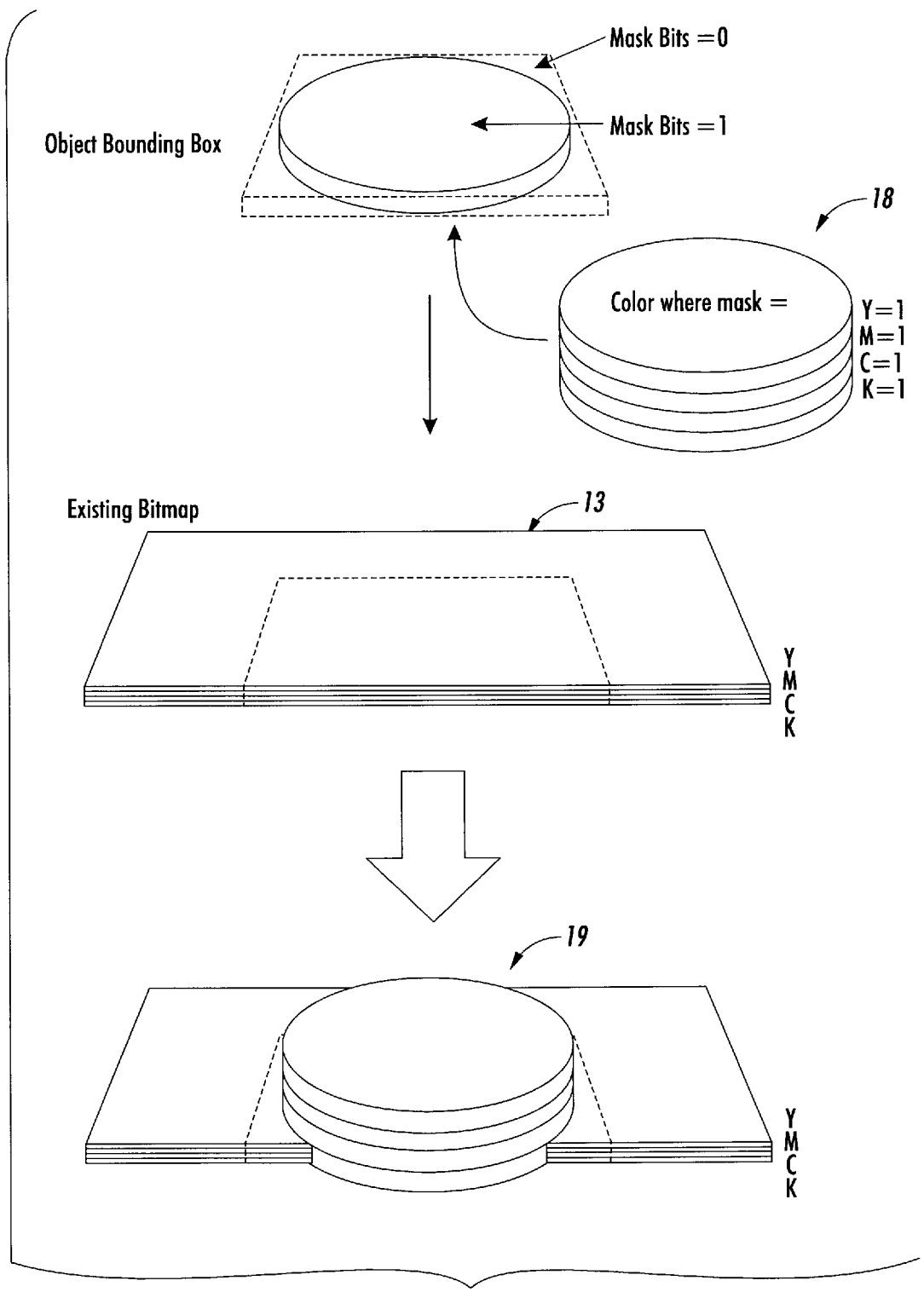
FIG. 4 shows a method of the prior art by which a process color black object is merged into existing separation bitmaps during page preparation process.

The opposite effect is shown in FIG. 4. In this case, a black object whose color is process black 18 instead of single color black is shown being merged into an existing set of bitmaps 13, one bitmap per separation. As explained in FIG. 1, in the prior art, for each separation bitmap, the merging process causes the color value of that separation to be written into the bitmap, obliterating whatever values were in that separation previously. The net effect in this case is a large change in colorant coverage in each separation, and a very large change in colorant coverage overall at the location of the merged process black object 19.

Figure 5:
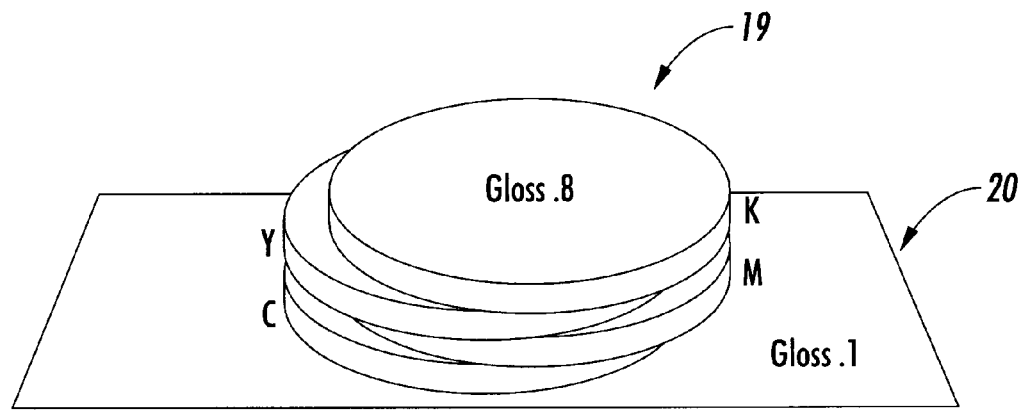
FIGS. 5 and 6 show sample outputs which demonstrate print quality problems produced by following the prior art method illustrated in FIG. 4.
Figure 6:
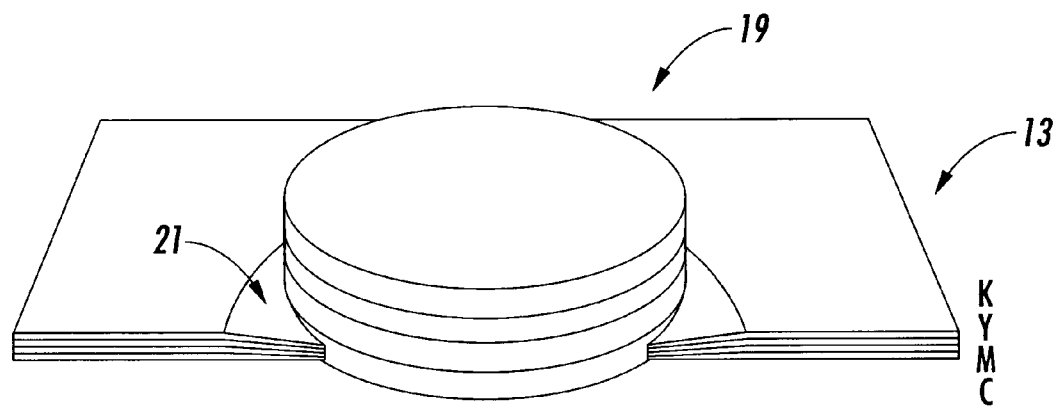

Some problems in print quality that the process black merging method shown in FIG. 4 may cause are shown in FIGS. 5 and 6. In FIG. 5, a process black object 19 is shown being imaged on top of a white paper background 20 using process black composed of cyan, magenta, yellow, and black toners. As shown in FIG. 5, in certain printing systems objectionable height differences can occur between the white background and the total pile height of all toners used in a process black. Further, large differences of gloss can occur. Also, with slight misregistration between separations, the edge of the process black object can spread, blur, and show chromatic fringes. Other problems with excess colorant coverage not shown in FIG. 5 can also occur, such as excessive bleeding and spread caused by excess ink in certain ink jet color printing systems. FIG. 6 shows a further problem with the prior art method of merging a process black object 19 into an existing bitmap 13. In some printing systems such as xerographic systems, the excess toner height will also cause additional deletions 21 in the color background surrounding the process black object, resulting in objectionable light colored fringes around the black object 19.

Figure 7:
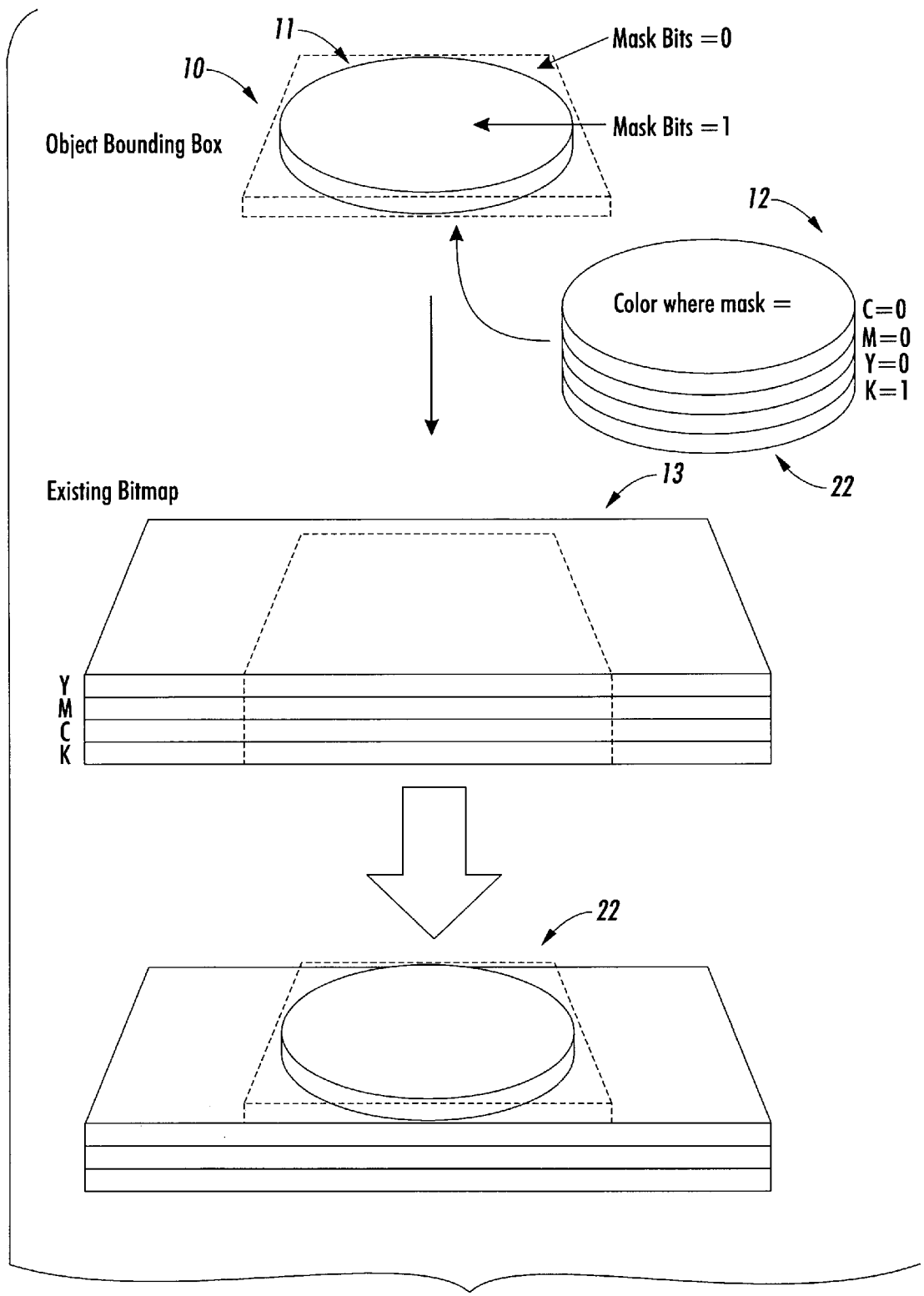
FIG. 7 shows a further step in the prior art shown in patent application Ser. No. 08/673,541 in which a single color black object is merged into existing separation bitmaps during page preparation process while preserving the background color.

FIG. 7 shows a prior art method (described in patent application Ser. No. 08/673,541) which is a different method from that shown in FIG. 1 for merging a single-color black object 15 into separation bitmaps. In this method, black objects with single color black color 12 are detected and merged differently from color objects into the existing bitmaps 13. Instead of writing the current value of each separation into the corresponding separation as in FIG. 1, only the black separation 22 is written, and the other separations are left intact. The color remains black because of the opacity of the black ink coverage, but the underneath color is unchanged.

Figure 8:
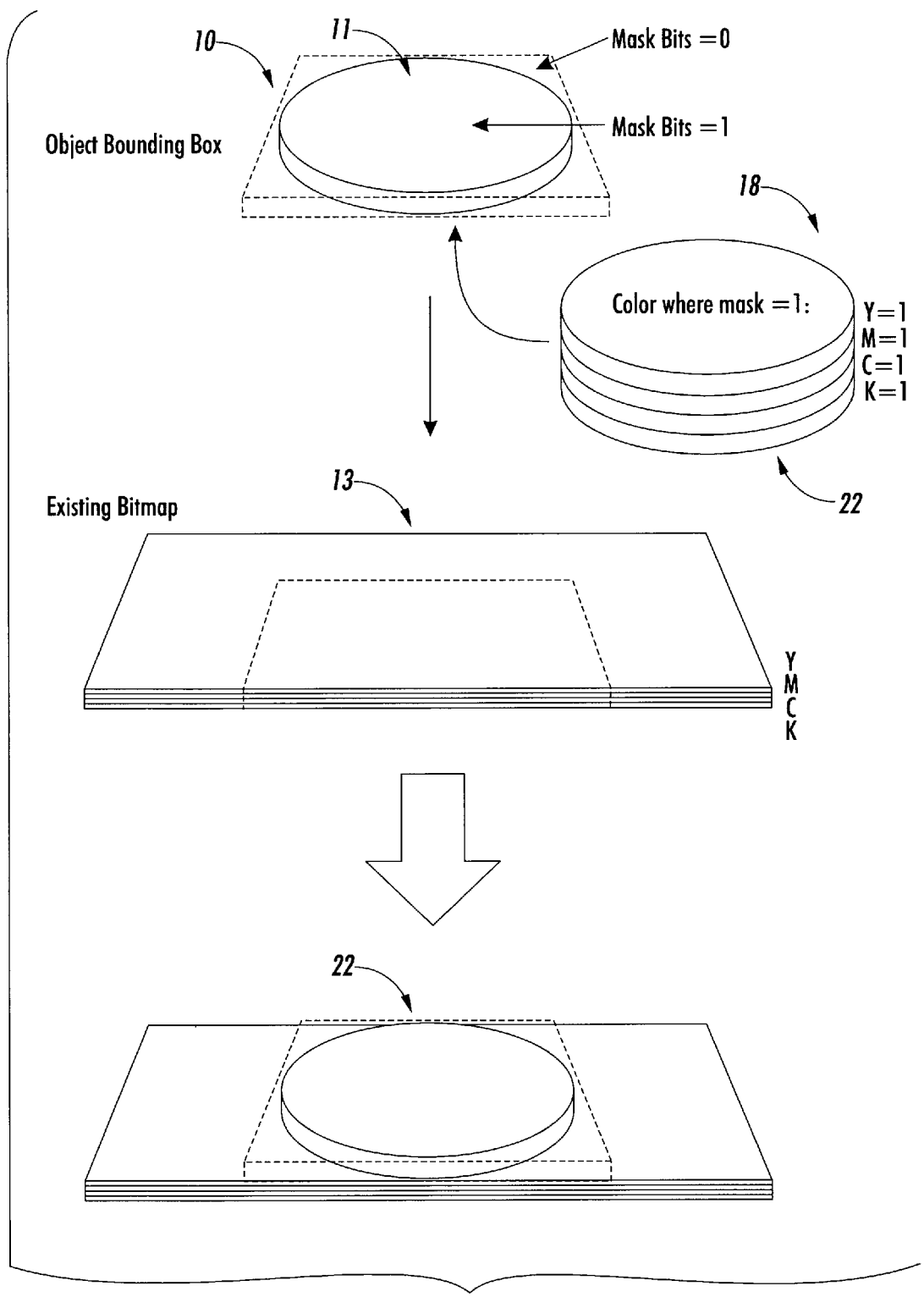
FIG. 8 shows a further step in the prior art shown in patent application Ser. No. 08/673,541 in which a process black object is merged into existing separation bitmaps during the page preparation process while preserving the background color.

Similarly, FIG. 8 shows the result of this different prior art method when a process black color 18 containing non-black colorants is merged into existing separation bitmaps 13. Again, the values in the non-black separations are ignored, and only the black separation 22 is written.

Figure 9:
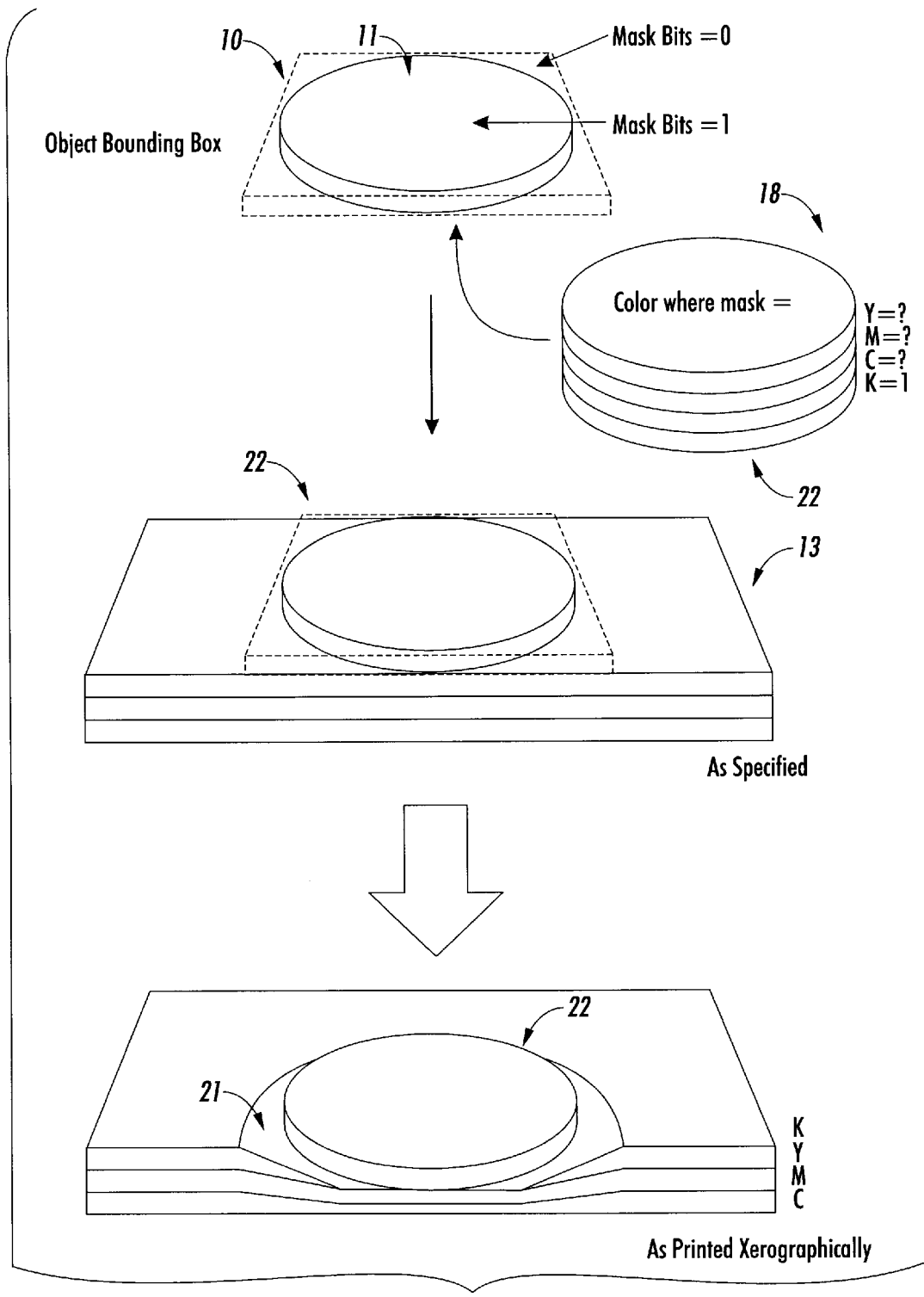
FIG. 9 shows a potential print quality problem which can be introduced by following the prior art method illustrated in FIGS. 7 and 8, in cases where the background color plus the black results in excessive total colorant. In xerographic printing, excessive colorant leads to a toner pile that is high enough to cause transfer problems of surrounding toner, for example.

FIG. 9 illustrates a problem that can arise using the prior art method of FIGS. 7 & 8. FIG. 9 shows that, particularly if the colorant coverage of the non-black separations 13 is already large, the addition of a full-black layer 22 on top can sometimes cause too much total colorant, which for example in some xerographic systems, for example, can still result in deletions 21 in the toner surrounding the imaged black layer 22.

Figure 10:
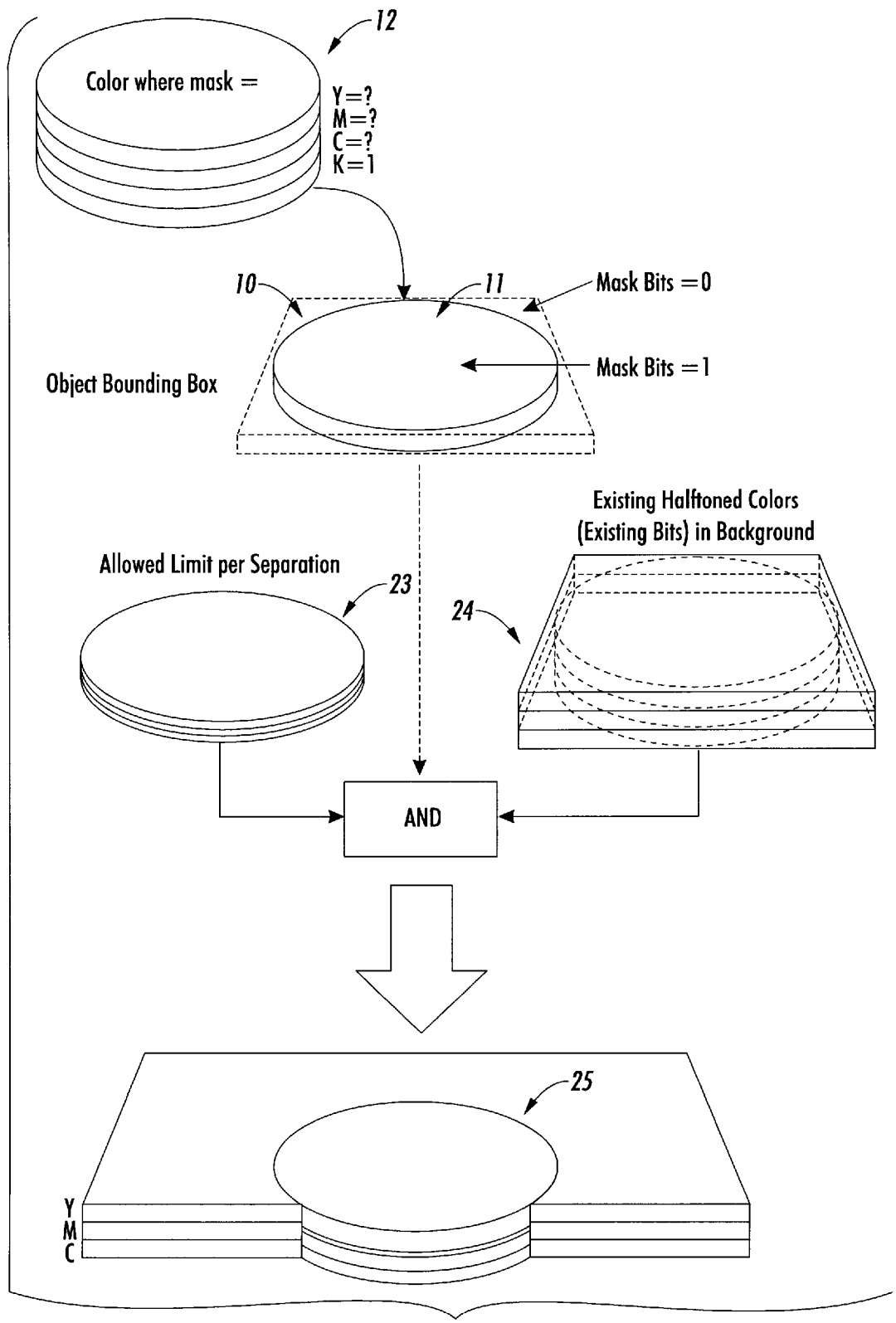
FIG. 10 shows a further step in the prior art shown in patent application Ser. No. xxxxxx by which the problem of excessive colorant shown in FIG. 9 can be sometimes avoided, by clipping the colorant allowed in each separation when merging into existing separation bitmaps.

FIG. 10 shows a further step in the prior art shown in patent application Ser. No. xxxxxx by which the problem of excessive colorant shown in FIG. 9 can be sometimes avoided, by clipping the colorant allowed in each separation when merging into existing separation bitmaps. By reading the existing bits 24 at the location where the black object will be merged, and ANDing those existing bits with a pre-defined maximum limit per separation 23, the resulting colorant beneath the black object 25 will follow the existing background up to a limit, and then be limited by the pre-set maximum to avoid excessive total colorant amounts.

Figure 11:
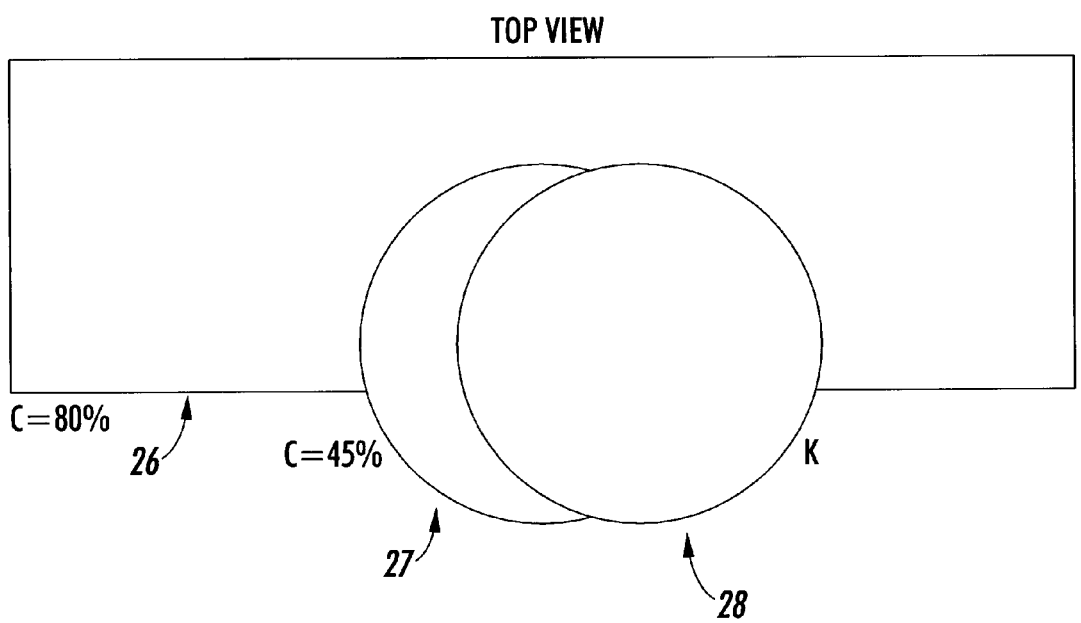
FIG. 11 shows a potential print quality problem which can be introduced by following the prior art method illustrated in FIG. 10, in cases where the amount of clipping in a low luminance separation such as cyan or magenta creates a noticeable lightness difference in the separation between the background and the black object. Although normally masked by the black ink, if the black separation is misregistered, a light-colored fringe can be visible between the background and the black object.

FIG. 11 shows a potential print quality problem which can be introduced by following the prior art method illustrated in FIG. 10, in cases where the amount of clipping in a low luminance separation such as cyan or magenta creates a noticeable lightness difference in the separation between the background and the black object. Although normally masked by the black ink, if the black separation 28 is misregistered, a light-colored fringe 27 can be visible between the background 26 and the black ink 28. As shown by example in FIG. 11, if the cyan separation was 80% in the background, and the clipping shown in FIG. 10 is done with a preset maximum of only 45%, and if the black separation is shifted, the difference between 80% cyan and 45% cyan will be quite visible as a light-colored fringe 27 around the black ink. The same visible fringing could occur in magenta, which is also low-luminance. A 45% maximum for clipping is often used because the total (45% yellow+45% cyan+45% magenta+100% black=235% total) is a reasonable limit on total colorant for a black object.

It is very important to note, however, that in the yellow separation, because yellow has such high luminance, the difference between an 80% yellow and a 45% yellow is NOT visible to the human eye. Reducing the yellow separation reduces pile height without introducing a fringing problem.

The method of the current invention (FIG. 12) takes advantage of the fact that for different printing problems (pile height or colorant amount were used as an example), some separations may be high-priority and some may be low priority. The current invention therefore proposes a method by which bits in a low-priority separation may be eliminated wherever bits already exist in a higher-priority separation. Then, the higher priority separations may be clipped to a larger allowed maximum limit. In the example shown, if cyan and magenta were able to be clipped to 70% instead of 45%, the fringe would not be visible.

Figure 12:
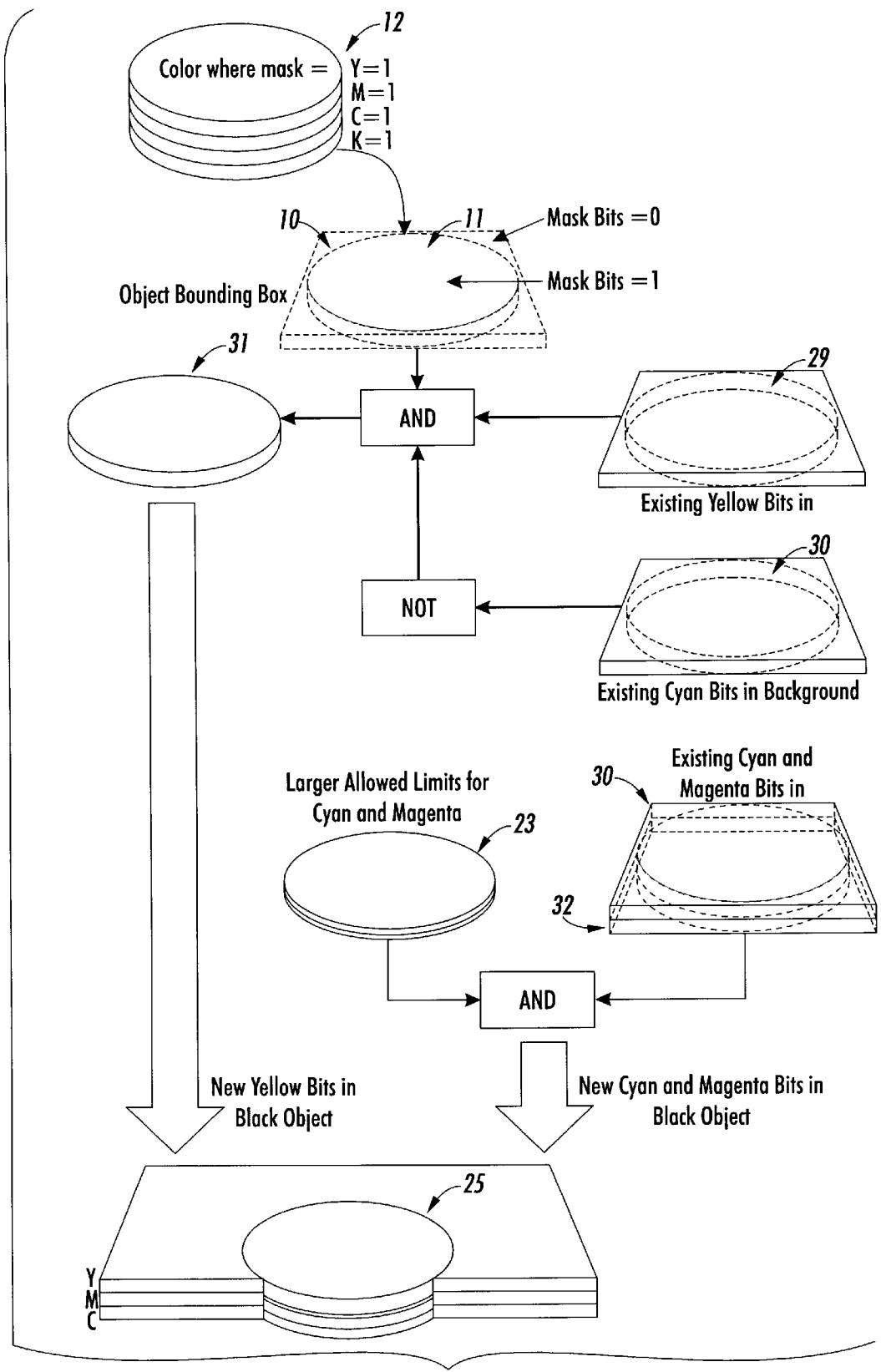
FIG. 12 shows by contrast the method of the invention whereby two clipping steps are done (in either order). One clipping step involves clipping one separation (eg, yellow) using the inverse of another (eg, cyan), so that yellow dots in the background are eliminated wherever cyan dots currently exist in the background. This produces reduced yellow bits in the resultant process black object. A second clipping step is the same as that in FIG. 10, but the clipping is done only on the remaining two separations (eg, cyan and magenta), and therefore larger maximum limits may be allowed without excessive total colorant amounts, because the yellow separation has already been reduced. Thus, the low-luminance separations such as cyan and magenta are not clipped as much as in FIG. 10, and the problem shown in FIG. 11 is reduced. Note that the fringing problem shown in FIG. 11 is invisible with a high-luminance separation like yellow.

FIG. 12 shows an example in which the yellow separation 29 is clipped by the cyan separation 30 (by ANDing yellow with (NOT cyan)). The resultant yellow separation 31 has no yellow bits wherever cyan bits already exist. Since cyan 29 and yellow 31 are guaranteed not to overlap, they can at most cause a pile height together of 100%, whereas previously they could together create a worst-case pile height of 200%. Since pile height is thereby more controlled, the maximum clipping limits 23 for cyan 30 and magenta 32 can be increased significantly. The resulting black object 25 has a larger cyan and magenta component so that fringing will not be as visible, a smaller yellow component where fringing is not noticed, and a controlled total pile height.

Figure 13:
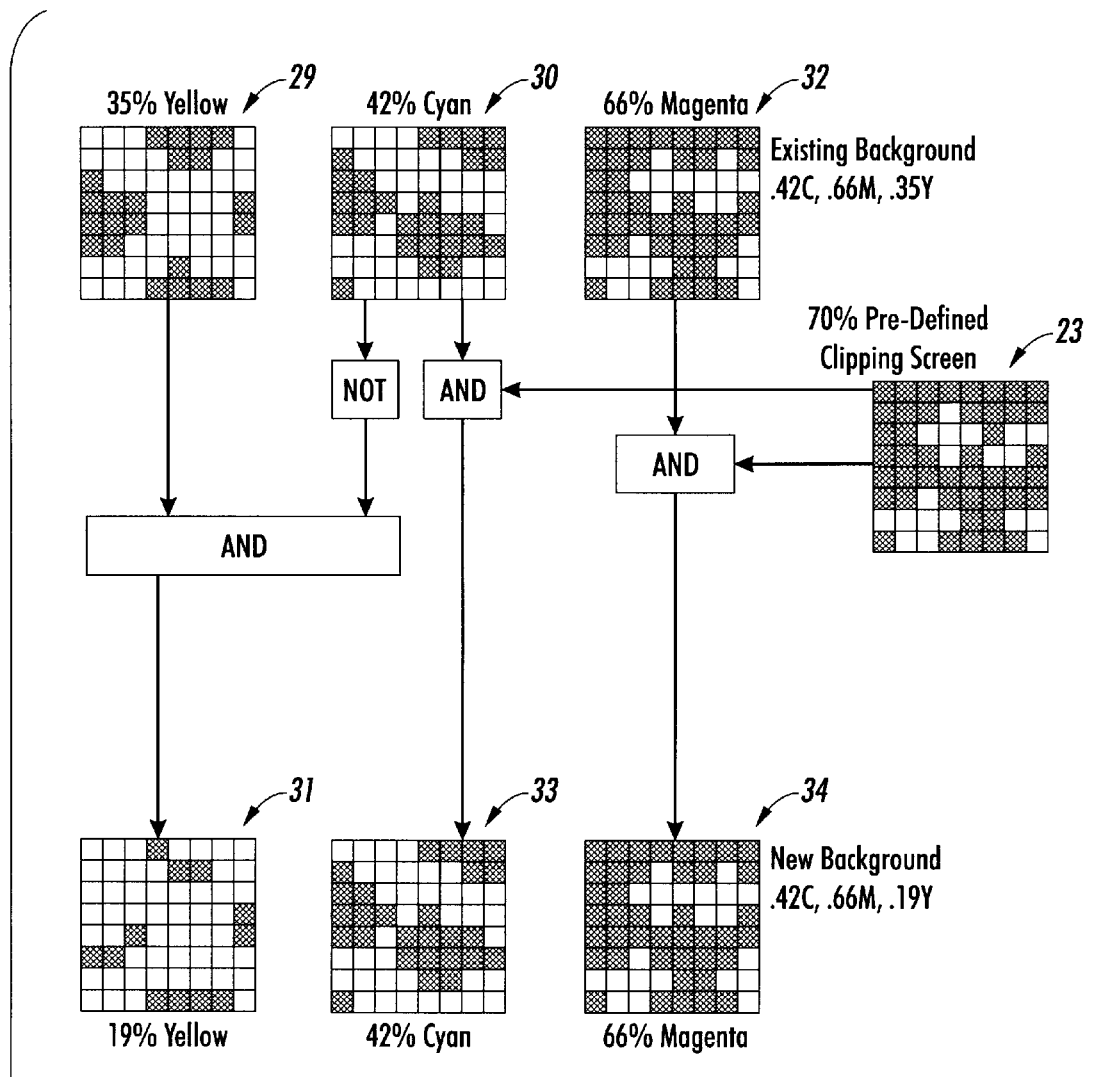
FIG. 13 shows in greater detail the double clipping steps of the current invention. Beginning with a background of 35% yellow, 42% cyan, and 66% magenta, the yellow separation is first ANDed with the inverse of cyan so that yellow bits are eliminated wherever cyan bits exist. This reduces any pile height problem caused by yellow plus cyan; at most, yellow plus cyan will equal 100%, whereas previously, yellow plus cyan could equal 200%. Thus, the cyan and magenta separations are clipped as in the prior art, but may be clipped less than in the prior art (to 70% in this example, vs 50% in the prior art. This preserves as much as possible of the magenta and cyan separations, where a large amount of clipping would show a light-colored fringe, by sacrificing the yellow separation, where a large amount of clipping is not as visible because yellow is so high-luminance.

FIG. 13 shows the method of this invention in greater detail at the bit level. In FIG. 13, a 35% yellow 29 is ANDed bit by bit with the inverse of a 42% cyan 30 to create a 19% yellow 31: only those bits in yellow that did not overlap with cyan are kept. Then, the 42% cyan 30 and a 66% magenta 32 are ANDed as in the prior art against a pre-set maximum 23, but that maximum may now be higher (70% is shown). This allows cyan 30 and magenta 32, in this example, to remain unclipped because the maximum 23 is so high, so that the resultant cyan 33 and magenta 34 are unchanged and no visible fringe will be created if the black ink is misregistered.

Figure 14:
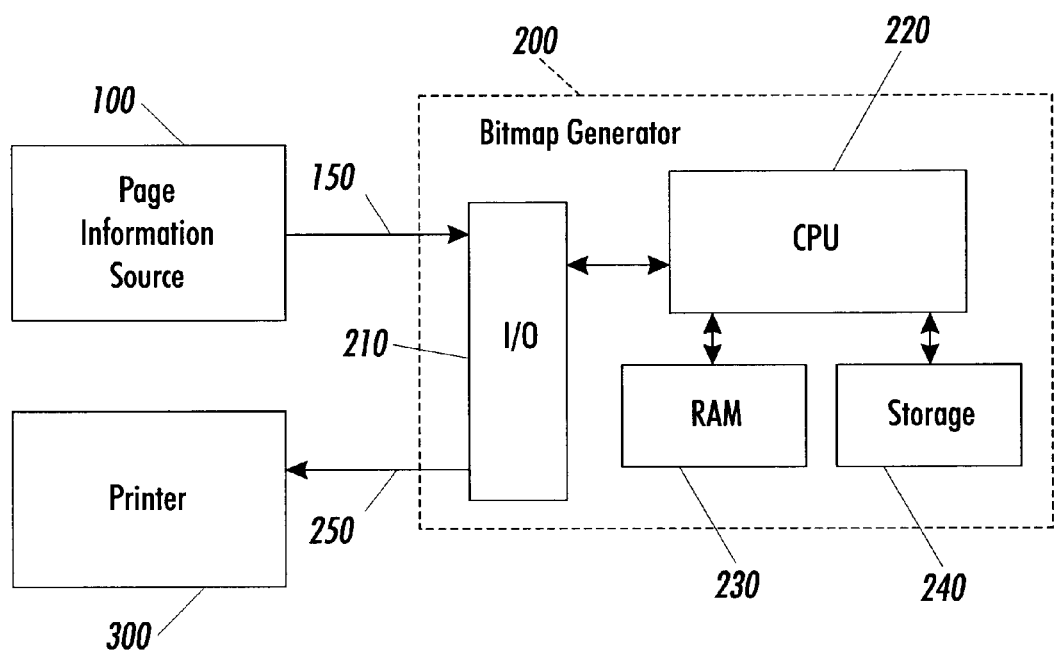
FIG. 14 is a block diagram of an apparatus made according to and for practicing the method of the invention, in which the changes to bitmaps according to the methods of the invention take place within the bitmap generator.

Referring now to FIG. 14, a generalized page printing system made according to the present invention is shown. It includes a page information source 100 connected via communication link 150 to a bitmap generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Bitmap generator 200 may be a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and bitmap generator 200 remain distinct. The methods as described herein remain applicable through a wide range of apparatus configurations.

FIG. 14 shows an embodiment in which the bitmap generator 200 is programmed to carry out the methods described herein and shown in FIGS. 12–15. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by bitmap generator 200 and generator 200 is programmed to carry out the method of this invention, generator 200 may in certain situations modify the output commanded by the page representation. As described herein, generator 200 may change the composition of the color of a black object contrary to the command of the page representation before merging it into the generated print data. Thus, the page as sent by a conventional page information source 100 will be printed differently than described, in order to accomplish the objectives of this invention for improving print quality. The advantage of this configuration is that page representations received from any number and variety of conventional page sources 100 may be automatically modified by generator 200 to print with higher quality.

Figure 15:
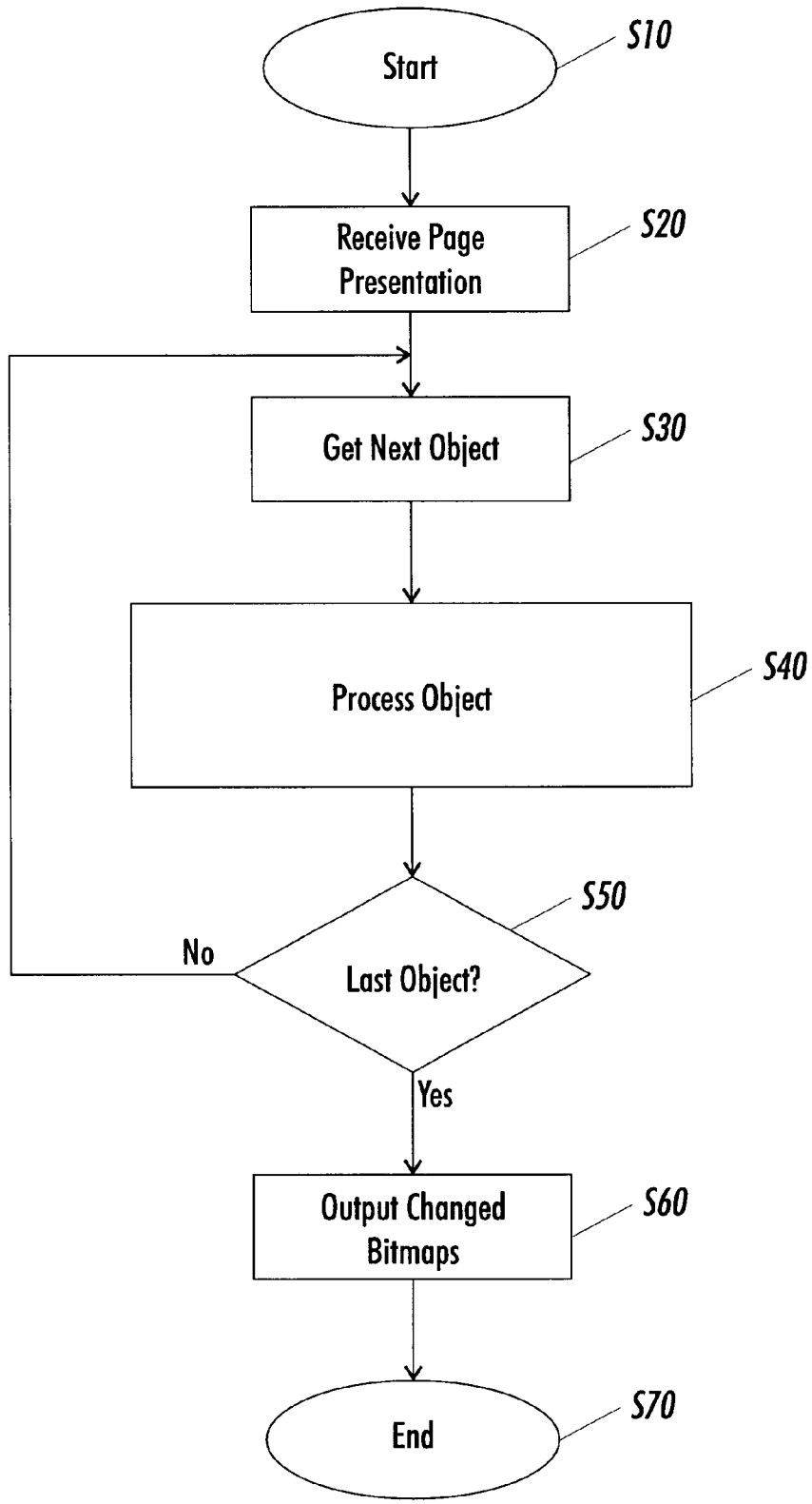
FIG. 15 shows a flowchart for the overall method by which a bitmap is produced from a more generic page representation.

FIG. 15 illustrates a generalized flow diagram of a process or method according to the invention by which a background and maximum limit dependent black image is formed. After starting in step S10, in step S20 a page representation is received. This page representation represents a collection of colored objects in a data format such as a conventional page description language or equivalent data format as previously described.

In step S30, the next object which has not yet been processed is retrieved from the page representation. This retrieved object is further processed in step S40 as will later be described in greater detail. In step S50, it is determined if this is the last object to be retrieved from the page description language. If it is not the last object, then control returns to step S30 where the next object is retrieved. Otherwise, if this is the last object defined by the page description language, control flows to step S60 where the bitmap, which has possibly been constructed differently than commanded by the page representation during the object processing step S40, is output.

The outputted changed bitmaps of step S60 consist of one bitmap per separation, where each separation corresponds to a colorant used in the printing process, and where the bitmaps provide instructions for printing each spot on the printable page for use by a raster color printer. In this case, the output step involves outputting the modified bitmap data to a network, a printer or a storage device. Finally, control flows to step S70, where the process ends.

Figure 16:
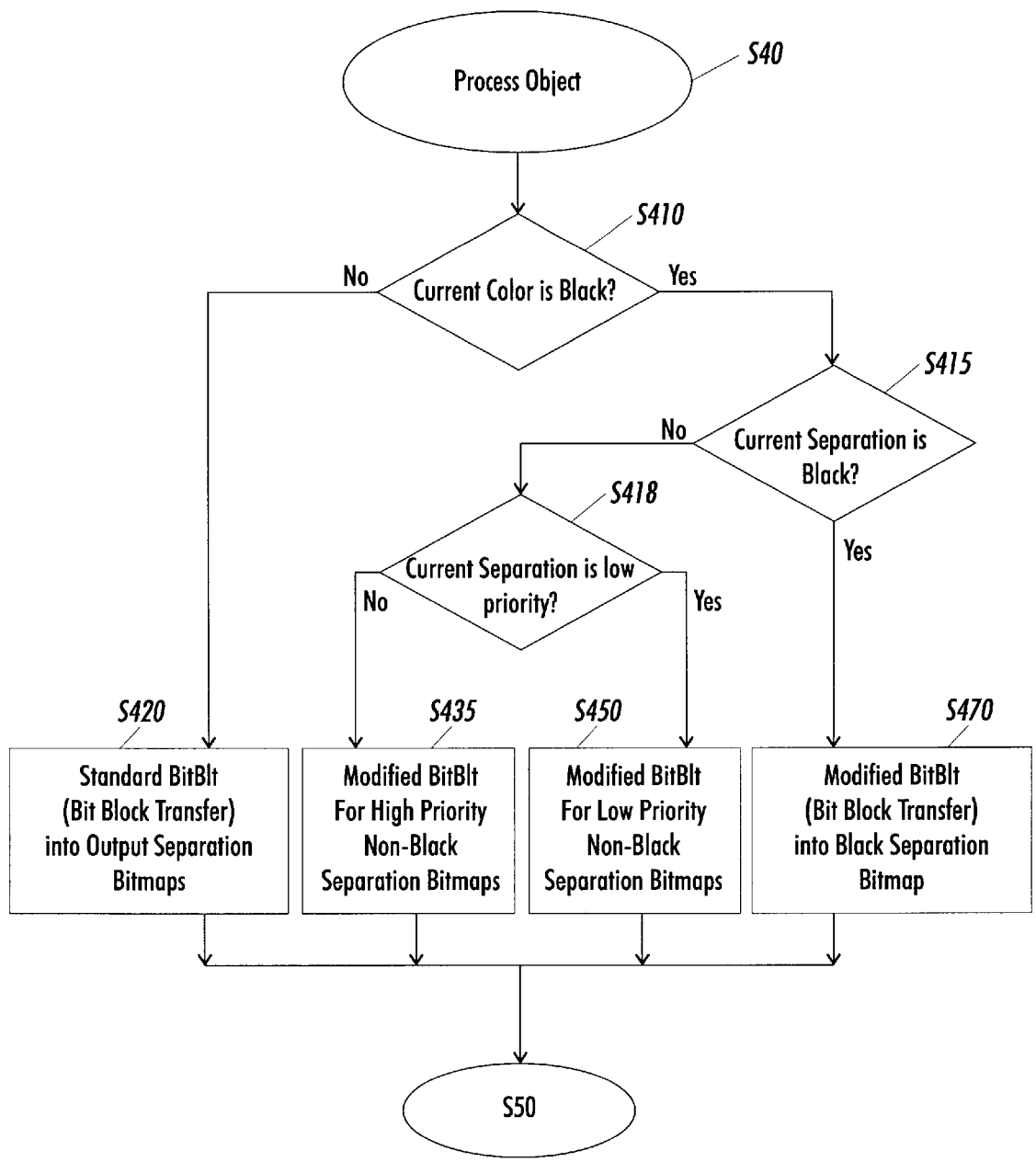
FIG. 16 shows the method by which each object is merged into the output bitmaps. Four different paths are shown, depending on whether the object is black or not, and for a black object, depending on whether the separation is a high priority separation that is clipped before merging as in the prior art, a low-priority non-black separation that clipped against a high-priority separation according to the method of this invention before merging, or the black separation that is merged as in the prior art.

FIG. 16 shows in greater detail the step S40 of processing an object In step S410, the color of the object to be processed is examined. The color of an object can be expressed in many color spaces or systems. However, in any commonly used color space it is possible to efficiently determine if the color black has been commanded. For example, some systems use an RGB color space, and black is generally defined in such systems as R=G=B=0. Other systems express colors as combinations of cyan (C), magenta (M), yellow (Y), and black (K). In such systems, black may be defined as C=M=Y=1, or alternatively as C=M=Y=K=1 (two forms of process black), or alternatively as K=1 (single-color black). In the L*a*b* system, L* is an expression of the luminance of a color, and L*=0 (zero luminance) is black. In practice, black may be defined more broadly if desired. For example, an L*<5 or a K>0.95 could be defined to be treated as black if desired. Some systems allow many color spaces to be used intermixedly, but in each case it is possible to define what combinations of the components of each color space will be defined as the color black.

If in step S410 the object color is not black, control flows to step S420, in which a standard BitBlt (Bit Block Transfer—described in FIG. 17) is performed to merge the object into the output separation bitmaps in such a way that it will be printed in the correct location, with the correct shape, with the correct relation to other objects on the page, and with the correct color.

Returning to step S410, if the object color is found to be black, the processing proceeds to step S415. If the current separation to be modified is not the black separation, processing proceeds to step S418 where it is determined if this is a low priority or high priority non-black separation. If it is a high-priority separation, control flows to step S435 where a prior art BitBlt is performed to merge the high-priority separation into the bitmap while clipping it to a pre-defined limit. However, if in step S418 the non-black separation is a low-priority separation, control flows to step S450 where a modified BitBlt, modified according to the methods of this invention, is performed to merge the low-priority non-black separation into its output bitmap after clipping it against a high-priority separation. However, in step S415, if the current separation to be modified is the black separation, processing proceeds to step S470 where a modified BitBlt, described in the prior art, is performed to merge the black component of the object into the existing black output separation bitmap.

Figure 17:
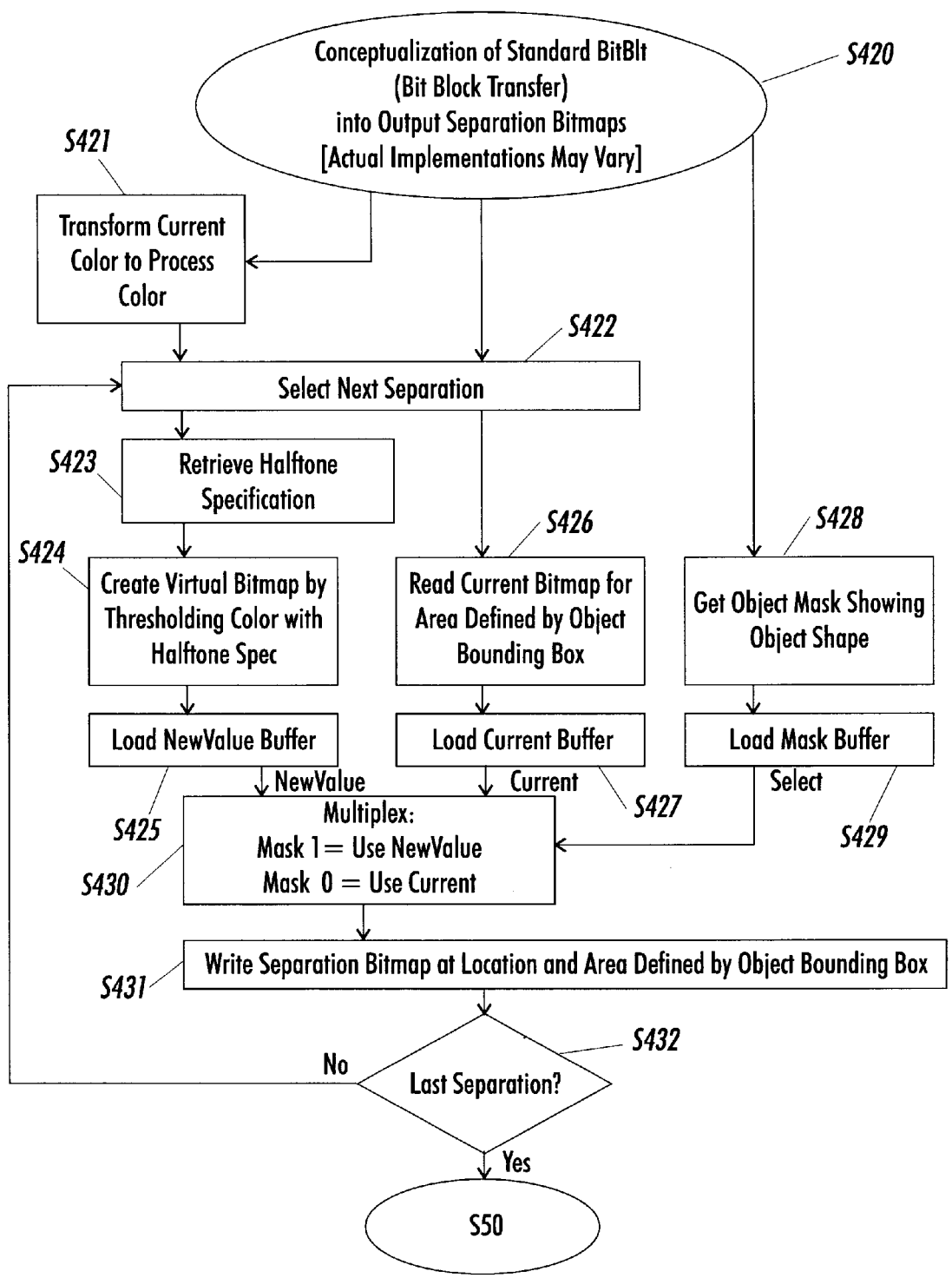
FIG. 17 illustrates conceptually the prior art method by which an object is normally merged into an existing bitmap, which is the method used in the invention for all non-black objects.

FIG. 17 shows conceptually the step S420 of performing a standard BitBlt (Bit Block Transfer) into a set of output bitmaps, one per separation. Actual implementations of this conventional step of merging an object into a bitmap may include modifications and special cases for performance reasons, but conceptually will be convergent with the steps shown in FIG. 17.

In step S421, the current color is retrieved from the graphical state and transformed into a process space.

Although page description languages often allow the color of an object to be expressed in many different color spaces or systems such as calibrated RGB or L*a*b*, all must ultimately be transformed to the specific colorant values needed by the particular printing process to accurately render the desired color. This color space is called a process space, most generally CMYK (cyan, magenta, yellow, black).

After the current color is transformed, in step S422 a loop is entered which processes each separation in turn. Three paths are followed in parallel, each leading to the loading of a buffer.

In the first path, in step S423, a halftone specification is retrieved which defines the halftone dot used for this particular separation. In step S424, by thresholding the separation value for the current color against the halftone specification of the dot, a "virtual" bitmap is created which gives the bits which need to be turned on in this separation in order to print correctly the color value designated by the current color. For example, in CMYK color space, the C (cyan) separation will have a specified value. This value is achieved in reality by turning the right number of dots on or off in the printer as controlled by the halftone specification for the cyan separation. Once the virtual bitmap is defined, the value is loaded into a NewValue Buffer in step S425.

In the second path, in step S426 the currently existing bitmap is read at the exact location and area defined by the location and bounding box of the current object which is about to be merged. In step S427, these bits are loaded in order into a Current Buffer.

Finally, in the third path, in step S428, the mask which defines the shape of the object is retrieved, and in step S429, is loaded into the third buffer, the Mask Buffer.

Once all buffers are loaded, in step S430 a Multiplexing operation takes place, in which the Mask Buffer is used to select between the New Value Buffer and the Current Buffer. Wherever the Mask is 0, that is, outside the defined shape of the object, the original Current bits are chosen to restore the bits that were already there. However, wherever the Mask is 1, that is within the object, the NewValue bits are chosen to be written as new data into the bitmap.

In step S431, the chosen bits are written into the existing bitmap in order, at the location where the object is to be written and in the size of the bounding box. This has the effect of writing the halftoned color of the object in exactly the location and shape defined by the mask.

Lastly, in step S432, the control loops back to step S422 if there are more separations to be processed, or exits to step S50 if this is the last separation.

Figure 18:
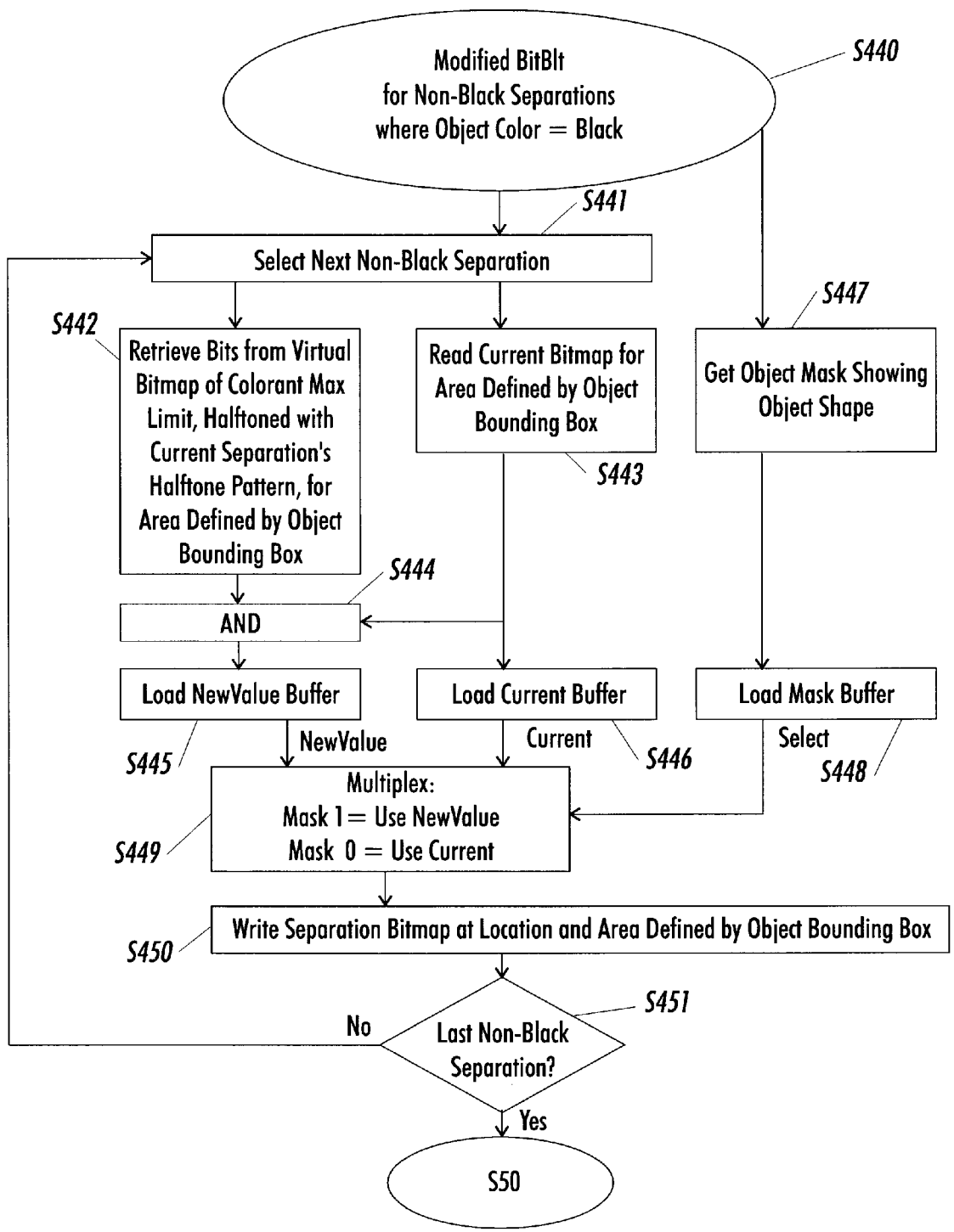
FIG. 18 illustrates conceptually the prior art method of patent application Ser. No. xxxxxx by which two chosen high-priority non-black separations of a black object are each merged into the existing non-black bitmaps while being clipped against preestablished limits.

FIG. 18 shows conceptually step S435, a method in the prior art of performing a BitBlt (Bit Block Transfer) of the high-priority non-black separations of a black object into the existing non-black output bitmaps. Actual implementations of this step of merging a black object into a bitmap may include modifications and special cases for performance reasons, but conceptually will be convergent with the steps shown in FIG. 18.

In step S436 a loop is entered which processes each non-black separation in turn. Three paths are followed in parallel, each leading to the loading of a buffer.

In the first path, in step S437, stored bits are retrieved which define, for that separation, the maximum colorant amount allowed. The bits have been previously generated by retrieving a pre-set maximum colorant amount for each separation, and running that value through a conventional halftone generator. By thresholding the maximum value for the current separation against the halftone specification of the dot, a "virtual" bitmap is created which gives the bits which would be turned on in this separation in order to print the maximum color value allowed. For example, in CMYK color space, the C (cyan) separation will have a pre-specified maximum allowed value. This value is achieved in reality by turning the right number of dots on or off in the printer. Once the virtual bitmap for a separation is defined and stored, its value is able to be retrieved each time in step S437.

In the second path, in step S438, the currently existing bitmap is read at the exact location and area defined by the location and bounding box of the current object which is about to be merged. In step S442, these bits are loaded in order into a Current Buffer.

Back to the first path, in step S440, the bits read in steps S437 are ANDed logically and bitwise with the bits read in step S438. This has the result of, in an extremely efficient way, clipping the halftoned bits to the minimum of the current bitmap or the allowed maximum bitmap. The result of the ANDing process, which is the same as the background bits unless they exceed the maximum allowed and are clipped, is loaded into the NewValue Buffer in step S441.

Finally, in the third path, in step S439, the mask which defines the shape of the object is retrieved, and in step S443, is loaded into the third buffer, the Mask Buffer.

Once all buffers are loaded, in step S444 a Multiplexing operation takes place, in which the Mask Buffer is used to select between the NewValue Buffer and the Current Buffer. Wherever the Mask is 0, that is, outside the defined shape of the object, the original Current bits are chosen to restore the bits that were already there. However, wherever the Mask is 1, that is within the object, the NewValue bits are chosen to be written as new data into the bitmap.

In step S445, the chosen bits are written into the existing non-black bitmap in order, at the location where the object is to be written and in the size of the bounding box. This has the effect of writing the non-black separations of the black object in exactly the location and shape defined by the mask.

Lastly, in step S446, the control loops back to step S436 if there are more high-priority non-black separations to be processed, or exits to step S50 if this is the last separation.

Figure 19:
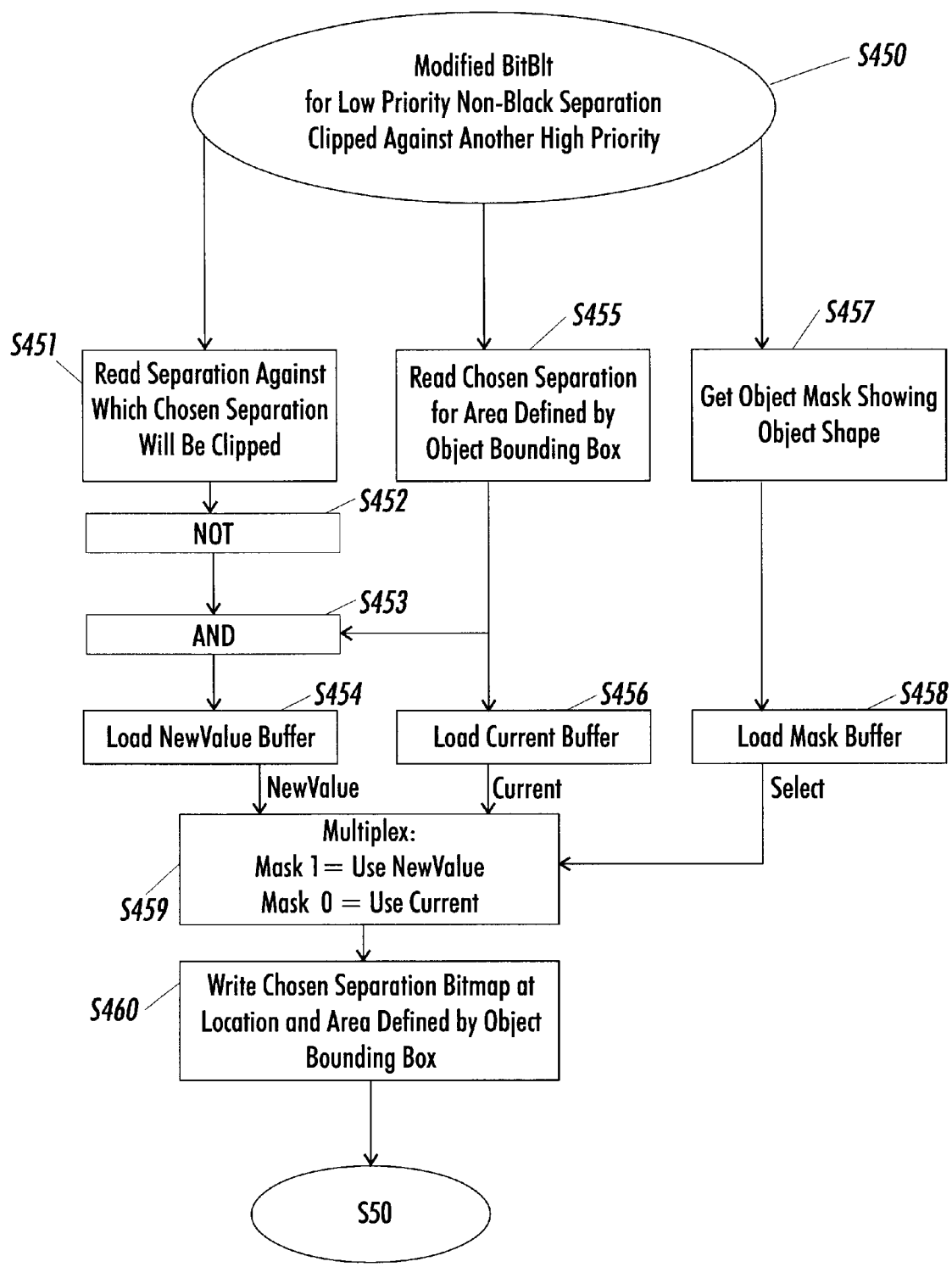
FIG. 19 illustrates conceptually the method of this invention by which one chosen low priority non-black separation of a black object is merged into the existing non-black bitmap after being clipped against another higher-priority non-black separation.

FIG. 19 shows conceptually step S450, a method according to the current invention of performing a BitBlt (Bit Block Transfer) of a low-priority non-black separation of a black object into its existing output bitmap after clipping it against a high-priority separation. Actual implementations of this step may include modifications and special cases for performance reasons, but conceptually will be convergent with the steps shown in FIG. 19. Three paths are followed in parallel, each leading to the loading of a buffer.

In the first path, in step S451, the bits of the high-priority separation against which the low-priority separation will be clipped are read at the exact location and area defined by the location and bounding box of the current object which is being merged. In step S452, these retrieved bits are inverted in a NOT operation.

In the second path, in step S455, the currently existing bitmap for the low-priority separation is read at the exact location and area defined by the location and bounding box of the current object which is about to be merged. In step S456, these bits are loaded in order into a Current Buffer.

Back to the first path, in step S453, the bits inverted in steps S452 are ANDed logically and bitwise with the bits read in step S455. This has the result of, in an extremely efficient way, removing a low-priority halftone bit wherever a high-priority bit is present, and leaving any low-priority bits which do not overlap a high-priority bit. The result of this ANDing process is loaded into the NewValue Buffer in step S454.

Finally, in the third path, in step S457, the mask which defines the shape of the object is retrieved, and in step S458, is loaded into the third buffer, the Mask Buffer.

Once all buffers are loaded, in step S459 a Multiplexing operation takes place, in which the Mask Buffer is used to select between the NewValue Buffer and the Current Buffer. Wherever the Mask is 0, that is, outside the defined shape of the object, the original Current bits are chosen to restore the bits that were already there. However, wherever the Mask is 1, that is within the object, the NewValue bits are chosen to be written as new data into the bitmap.

In step S460, the chosen bits are written into the existing non-black bitmap in order, at the location where the object is to be written and in the size of the bounding box. This has the effect of writing the low-priority non-black separation of the black object in exactly the location and shape defined by the mask, but with all bits turned off wherever a high-priority bit is turned on.

Figure 20:
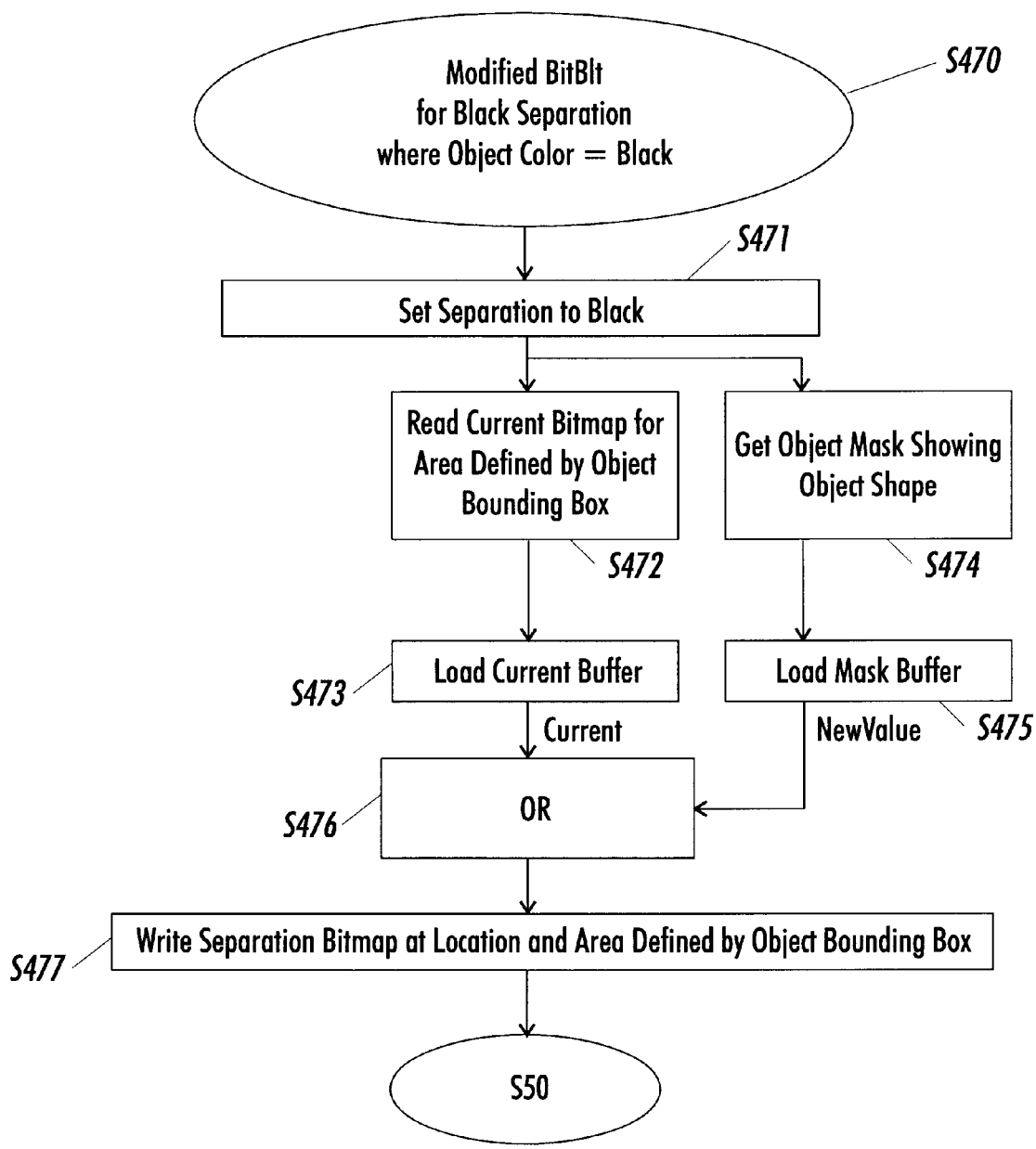
FIG. 20 illustrates conceptually a prior art method shown in patent application Ser. No. 08/673,541 by which the black separation of a black object may be merged into the existing black bitmap.

FIG. 20 shows the steps S470 used in the prior art shown in patent application Ser. No. 08/673,541 for merging the black separation of a black object into the existing black bitmap. In step S471 the current separation is set to black. From step S471, control flows to two parallel paths, each of which load a buffer.

The first path, shown by steps S472 and S473, loads the Current Buffer in the manner described above in FIG. 17. Similarly, the second path in steps S474 and S475 loads the Mask Buffer as described in FIG. 17.

In contrast with FIG. 17, Step S476 in FIG. 20 shows that the Mask Buffer is now used as the NewValue, and the Current Buffer as the Current, and the two buffers are no longer multiplexed but simply logical OR'd. This is because since we know the object is black (ie, all bits turned on), the Mask Bits adequately define that color value (the Mask bits are all 1 (black) within the shape of the object). By OR-ing the two input streams, wherever the Mask is 0 (ie, outside the shape of the object), the Current bits will be returned to their current value. However, wherever the Mask is on, 1 bits (black) will be written into the black bitmap. It would, of course, be possible to perform the black separation mixing as in FIG. 17, but the method described in FIG. 20 avoids both color transformation and multiplexing steps.

Finally, in step S477, the resulting bits are written into the black bitmap at the location and area defined by the bounding box of the current object, and control exits to step S50.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. The method of printing to a color printer from a number of separations, one of which is black, at least one of which is a first non-black color and one of which is a second non-black color, to print a black area over a color background, comprising the steps of:

determining a value of maximum colorant amount for the first non-black separation of the color background, generating values describing a first original colorant amount for the first non-black color separation of the color background and a second original colorant amount for the second non-black color separation of the color background, in the first non-black separation, modifying the first colorant amount to be either the maximum value, or the original value, whichever is less, in the second non-black separation, reducing the second colorant amount responsive to the first colorant amount, and printing the modified area.

2. The method of claim 1 wherein the determining step creates a value in the form of a bit map using a halftone dot having the maximum colorant amount, the generating step comprises converting the area of each separation into a bit map using a halftone dot, the modifying step comprises comparing the original first colorant amount and the maximum colorant amount halftone dots, and the reducing step comprises comparing the first colorant amount and the second colorant amount halftone dots.

3. The method of claim 2 wherein the modifying step comprises ANDing the bits of the original first colorant amount and the maximum colorant amount halftone dots.

4. The method of claim 2 wherein the reducing step comprises ANDing the bits of the second colorant amount with the inverse of the bits of the first colorant amount.

5. The method of claim 3 wherein the modifying step comprises reading each bit from the separation, modifying it, and returning it to the separation.

6. The method of claim 4 wherein the reducing step comprises reading each bit from the separation, modifying it, and returning it to the separation.

7. The method of printing to a color printer from a first separation which uses a bit map to define a first original background color area, a second separation which uses a bit map to define a second original background color area, and a separation of bits to define a black area over the background area, comprising the steps of:

additionally using a halftone dot to specify a maximum density bit map, within the black area, ANDing each bit of the first original background color bit map with the corresponding bit of the maximum density bit map to form a modified first background color bit map, within the black area, ANDing each bit of the second original background color bit map with the inverse of the corresponding bit of the first original background color bit map to form a modified second background color bit map, and printing the modified background color bit maps as the color separations and the bits defining the black area as the black separation, to limit the difference between the colorant amounts of the black area and the color background.

* * * * *